April 25, 1967  J. M. REED  3,316,545
DETECTOR FOR NATIVE PARTICLES OF GOLD AND PLATINUM
Filed July 27, 1964
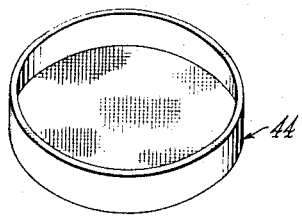
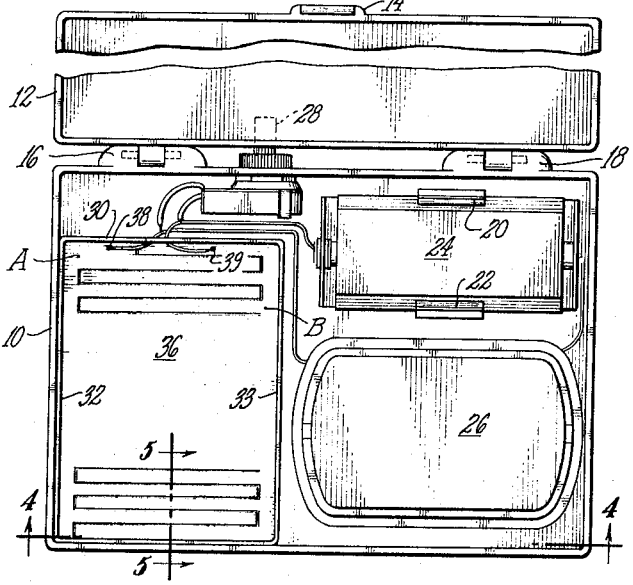
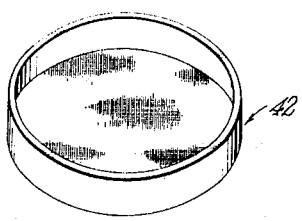
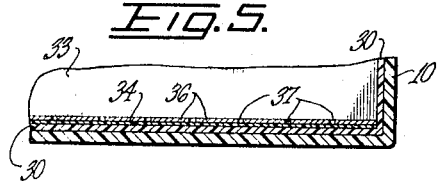
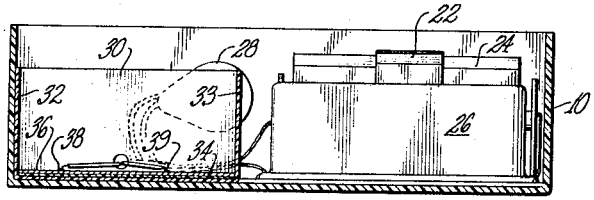
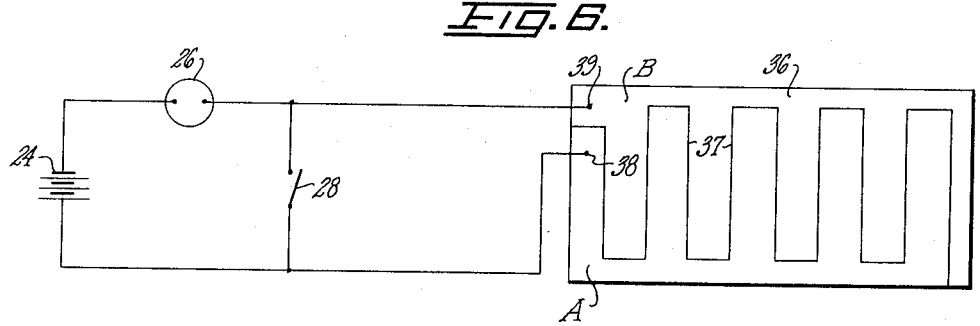
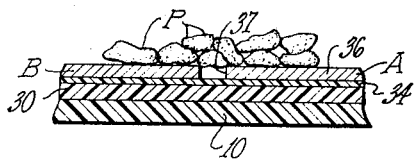
INVENTOR.
JESS M. REED
BY
Howard L. Johnson
ATTORNEY

United States Patent Office 3,316,545
Patented Apr. 25, 1967

3,316,545
DETECTOR FOR NATIVE PARTICLES OF
GOLD AND PLATINUM
Jess M. Reed, 620 S. Inglewood Ave.,
Inglewood, Calif. 90301
Filed July 27, 1964, Ser. No. 385,363
4 Claims. (Cl. 340—236)

This invention relates to a device and method for identifying small quantities of metallic gold and platinum. These are the only metals which occur in appreciable amount in the natural state as small particles of elementary metal, as distinguished from metallic ores; the latter consist of compounds such as metallic sulfides and oxides which are generally not electrical conductors (even if they were dispersed as small particles rather than in an ore deposit). By the present invention, the (loose) gold and platinum particles are identified by their electrical conductivity. In the natural state, such particles may be found mixed with sand, gravel, silt, or may be embedded in harder formations which must first be crushed to small aggregate size for testing.

The present device is not intended to separate such particles of precious metal (if present in the sample), but rather to yield a quick indication from a small test quantity—consisting of as little as a teaspoonful or less—as to whether such a deposit has any mining potential. Thus, with such a portable device, a prospector can rapidly and repeatedly test an alluvial deposit at intervals of every few feet if desired. Or with little additional equipment (such as a pick and hammer) he can take samples from a cliff face or old mine shaft at any required spacing (e.g. following a visible strata) as he moves along, and test each such sample immediately on the spot. This is in marked contrast to having to package and label samples, and then submit them to a distant assay office, with a resulting loss of time as well as much greater expense.

The present device finds special utility in arid regions where water is not readily available for identifying gold by panning. In fact, the present determinations are preferably conducted on dry samples; or if liquid is present in the sample, desirably it should be non-conducting (e.g. oil or distilled water) since the device responds to very small traces of electrically-conducting particles. Thus it would give an indication merely with salt water. Accordingly if a slurry of ore in brackish water were tested, the "background" signal given by the brackish water itself would first need to be determined. However it is a simple matter in the field, when such small test samples are required, to heat the test sample to dryness before placing it in my device.

It should also be observed that the present device is not a "treasure locating" apparatus such as is currently employed to locate buried deposits of metal or metallic conduits or containers, such as bullion or a metal vault. It does not test anything which is not placed in the device, and the information conveyed from such determination is dependent upon the sample consisting of natural mineral deposit, occurring or reduced to particle size. In addition, it does not detect gold compounds of ore, such as gold telluride. It is not intended for use with ore deposits after they have been chemically treated.

In essence, the present invention employs a low voltage electric circuit (including a signalling device or indicator such as a light or sound producer) which circuit has a thin insulating gap of predetermined width (e.g. 0.010 inch) which is disposed to be transiently bridged by any electrically conducting particle so as to complete the circuit and thus momentarily operate the signalling device. This can be effected by sliding a small (aggregate-type) sample slowly over a conducting surface which is traversed by one or more of such gaps which thus divide the surface into a pair of separated areas which are series-connected in the circuit.

A particular advantage of my device arises from provision of a zigzag pattern of such insulating gaps, formed of uniform width in a flat, conductor-surface (e.g. copper slide plate) by a technique somewhat analogous to that employed in "printed circuit" manufacture of television and other electrical devices wherein it is desired to avoid hand wiring of intricate circuits. By way of comparison, conventional printed circuit technique first "fixes" on a permanent backing surface a conducting ribbon of copper, and then removes the remainder of the original copper surface by etching with chemicals. However, for my invention, starting with a somewhat thicker metal plate (e.g. 0.1 to 0.01 inch) fastened permanently to a backing panel, the zigzag pattern of a narrow insulating gap is etched across it so as to completely separate the (copper) plate into two matching areas. Thus, in contrast to "circuit fixing," these edge-matched areas of my conductor plate are "fixed" against removal, and the thin lines which separates their matching edges is removed by etching. Conventional printed circuits leave thin ribbons of conducting copper on a backing panel; my process removes such ribbons and leaves the rest of the copper plate.

Such procedure enables me to produce a very narrow insulating gap in the slide plate, having uniform and controlled width which is thus correlated with the minimum size of (screened) particles in the test sample. In addition, repetition of such transverse lines or insulating gaps by means of the zigzag pattern on a relatively small slide plate enables the particles of my small test sample to repeatedly cross such line many times in a few manual oscillations of the sample box 30 since the whole sample does not have to travel the entire length of the channel. Or considered another way, each sample in the test box may be considered to be divided into as many segments as there are transverse insulating gaps across the channel; each segment is thus tested simultaneously as the whole is oscillated along the channel length.

In preparing my slide plate, the pattern for the transverse zigzag lines or insulating gaps is first laid out as a white or transparent line on a sheet of otherwise opaque material, usually on an enlarged scale. This drawing is then photographically reduced by a camera which makes a negative which is the final size of the pattern on the slide plate 36. A copper sheet 36 of the required size is provided attached to a non-conducting backing panel 34, with the smooth, subsequently ore-exposed face or slide surface of the copper cleaned and degreased. A light-sensitive enamel (commonly called "coldtop" by photo-engravers) is uniformly spread over the copper surface and simultaneously dried as by a rotating container known as a "Whirler," which leaves a thin, even, dry coating in two to three minutes. Or it can be sprayed on as an aerosol.

The photonegative is then held tightly against the coated or sensitized copper sheet (as by a vacuum frame) and a short exposure is made to a carbon arc lamp. This sensitizes or fixes the black or opaque area of the original drawing (which is transparent in the negative). The plate is then immersed in a tank of dyed alcohol developing solution which dissolves the coating area which was not exposed to the arc light. The enamel areas which were exposed to the light are insoluble in the alcohol developer but they absorb the purple dye and thus allow visual inspecton of the pattern upon removal from the solution. After washing and drying, the plate is ready for etching.

Conventionally, copper is etched with ferric chloride. Either the printed sheets or plates can be immersed in an agitated tank of ferric chloride, or it can be blasted with a fine spray of ferric chloride. In either event, the etched surface is then washed to remove all traces of the chemical and the dried, now two-part slide plate 36 which is attached to its backing panel 34 can be fastened in the sample box or frame 30 and connected into the electrical circuit.

The objects of my invention are to gain the advantages set forth which may become more apparent in the following detailed description. In the accompanying drawings which illustrate a presently preferred embodiment of my invention and which is not to be construed as a necessary limitation of the structure thereof:

FIGURE 1 is a top plan view of the opened case of my device (the lid broken lengthwise) showing the electrically-connected elements of my portable ore-testing assembly therein;

FIGURES 2 and 3 are perspective views of the accompanying pair of screens used successively to sort crushed ore or sand prior to testing samples of suitable particle size in the device;

FIGURE 4 is a vertical sectional view taken through the case along the line 4—4 of FIGURE 1;

FIGURE 5 is a fragmental, enlarged vertical sectional view through the electrically-conductive "riffle board" as viewed along the line 5—5 of FIGURE 1;

FIGURE 6 is a schematic diagram of the electrical circuit of the device; and

FIGURE 7 is a fragmental, transverse sectional view through the conductor plate, further enlarged, showing particles of a thin layer of test sample overlying an insulating gap of the board.

My method and apparatus can be employed in a permanent installation of any size or capacity (including those with a continuous flow of material samples) such as may be located at a mine, mill, or other analytical or processing plant. A particular advantage arises however, by reason of its embodiment in a handable unit which is small enough to be carried in the field in a coat pocket and thus can be used at any location to test samples of an ounce or less, by means of a self-contained energy source such as a 6-volt dry cell or "A" battery. Preferably a dry sample is tested. If a slurry or liquid suspension is used, the liquid medium should be separately tested for its conductivity.

As a housing container, there is provided a generally rectangular case 10 formed of fairly light-weight material such as molded plastic or fiber-board. A cover or lid 12, with latch means 14 along one edge, is hingedly connected to the case along its opposite edges at 16, 18. Within the case are mounted clasp arms 20, 22, which are adapted to yieldingly hold a replaceable dry cell 24. A signalling or indicating element 26, here represented by an audible buzzer, is connected to the battery through a test switch 28 which may be momentarily closed at will to ascertain that the circuit and battery are operative, such as before or after each sample of ore is tested (especially when the indicator fails to respond to the ore). Instead of a buzzer, the indicator 26 may embody a lamp bulb, an ammeter, or a microphone (whether in an accompanying headpiece or connected to an indicating or recording device at a distance).

Within one portion of the case 10, such as laterally abutting two adjacent sides, there is fixed an open-top, conveniently rectangular, cradle or frame 30, of which the side walls 32, 33 form a longitudinal channel along which samples of ore can be reciprocally slid by manual tilting or rocking the case (or by merely reciprocating it along a horizontal plane). Fixed to the bottom of the frame 30 so as to form a (horizontal) floor thereof, is a backing panel 34 (of plastic, fiber-board, glass fiber or other insulating material) having a smooth copper plate 36 secured to its upper surface. The plate 36 is divided into two separate areas A and B to form a "riffle board" by means of a transverse zigzag pattern of etched lines or insulating gaps 37 of predetermined and uniform width (as explained elsewhere herein). That is, the edges of the conducting metal plate along opposite sides of the gap are mutually parallel and are spaced apart equidistantly. By means of the transverse, zigzag pattern, a layer of ore supported on the plate 36 need slide along only a small portion of the distance of the channel in order for each of the particles P theoretically to cross the gap 37 at some point. By using a relatively thin multilayer of particles and repeatedly reversing their direction of linear movement, the entire sample is quickly tested. Each area A, B is remotely connected by lines of the electrical circuit at 38, 39 respectively; direct connection between the two areas is made only by at least one ore particle (FIG. 7) of electrically conductive material (transiently) bridging the gap. That is, presumably only a small fraction of the total number of particles in the sample are electrically conducting, but the indicator 26 will signal when at least one such particle bridges the gap 37.

Before a subsequent ore sample is placed in the empty frame, the exposed face of the conducting plate 36 is cleaned, as by a brush and/or cotton batting or steel wool (not shown) which may be stored in the case 10. In order to remove from the sample, ultra fine particles or dust (of less diameter than the width of the gap 37, and which therefore might clog the gap to the exclusion of a conductive particle) there is provided a fine screen 42, which may also be stored in the case 10. Another screen 44 of coarser mesh may be provided to initially remove larger lumps. Thus, the particles which pass the coarse screen 44 and do not pass the fine screen 42 are emptied into the sample box 30 for testing. The size (e.g. 80 mesh) of the fine screen 42 is correlated with the width of the insulating gap 37 (e.g. 0.01 inch) so that only minimum size particles which will span (not drop into) the gap 37 of predetermined width, are left in the sample which is slid across the plate 36. It should also be observed that the present grooved conductor plate 36 differs from the conventional "riffle board" of gold mining usage in that the latter contains grooves or slots adapted to receive and retain particles of gold, and thus to separate them from the gangue or gravel. In contrast, my detector does not segregate the native particles of electrically-conducting precious metal; rather it quickly indicates their presence or absence in the sample so that a suitable method of separation can then be applied to the larger deposit, depending in part upon the other components of the sample.

Backing panels 34 with adhering sheets or plates of copper suitable for "printed circuit" etching are readily available articles of commerce. "Coldtop" or "photofix" preparations are similarly well known. Instead of the copper slide plate 36, any smooth-surfaced conducting material (including synthetic plastic) can be used, and a corresponding etching agent which is appropriate for the particular conducting material will be employed.

Metals or alloys which can be etched with 36° Baumé ferric chloride include aluminum, beryllium-copper, brass, constantan, hastalloys, havar, imar, ivar, Inconels, kovan, lead, molybdenum-permalloy, Nichrome, nickel, nickel-silver, Ni-Span-C, phosphorus-bronze, stainless steel, and tin. Hydrochloric acid will etch aluminum, chromium or magnesium. Chromic-sulfuric acid mixtures can be used to etch beryllium-copper, brass or copper. Aqua regia will etch gold, palladium and platinum, although such expensive metals would not ordinarily be used as a conductor plate. Aluminum, molybdenum or tungsten can also be etched by sodium hydroxide; copper or tellurium by ammonium persulfate; germanium or tellurium by hydrofluoric acid; magnesium, silver, tellurium or zinc by nitric acid; in some cases, other mixtures or pairs of oxidizing acids may be used, etc.

It will be clear to those skilled in the art that various changes of construction and operation may be made within the present inventive concept, having in mind the substitution of functional equivalents and modification of structural features, and therefore this disclosure is not to be limited by the precise details shown and described by way of example, but it is my intention to hereafter claim the invention broadly in its distinction from the piror art.

I claim:
1. A device for detecting small particles of electrically conductive material such as metallic gold or platinum, the device comprising in combination:
  a relatively smooth, slide surface of electrically conducting material, which surface is divided into at least two separate areas by a thin insulating gap of predetermined width;
  channel means at least partially enclosing said slide surface to contain a sample of finely divided material such as crushed ore, sand or gravel, for movement of said material over said surface between the two areas, whereby electrically-conducting particles contained therein may transiently bridge said insulating gap, and thus close an electrical circuit between said two areas; and
  an electric power source and electric-responsive indicating means, each forming a segment of a continuous circuit through said successive surface areas, whereby closing of the circuit by one or more of said particles causes the indicating means to signal the presence of electrically-conducting particles in the sample.

2. The device of the preceding claim 1, wherein said surface consists essentially of a copper plate divided into said two separate areas by said gap shaped as a transverse zigzag pattern along said slide surface.

3. Handable apparatus for detecting small particles of metallic gold and platinum in samples of natural deposits, the apparatus comprising in combination:
  screening means for removing ultra-fine particles from a sample of finely divided material such as crushed ore, sand or gravel;
  a relatively smooth, slide surface of electrically conducting material, which surface is divided into at least two separate areas by a thin insulating gap of predetermined width, which gap has a width adapted to be spanned by the smallest particles which fail to be removed by said screening means;
  channel means at least partially enclosing said slide surface to contain said screened sample for movement thereof over said surface between the two areas; and
  electric power means and indicating means, each forming part of a continuous circuit through said successive surface areas, whereby closure of the circuit by electrically conducting particles causes the indicating means to signal the presence of gold or platinum in the sample.

4. The device of the preceding claim 1 wherein said slide surface is approximately horizontally disposed and said thin insulating gap repeatedly traverses the length of said surface.

References Cited by the Examiner
UNITED STATES PATENTS

| | | | |
|---|---|---|---|
| 412,924 | 10/1889 | Kester | 324—3 |
| 448,762 | 3/1891 | Grier | 209—408 |
| 1,119,255 | 12/1914 | Durkin | 209—408 X |
| 2,127,538 | 8/1938 | Seiger | 340—235 X |
| 2,424,735 | 7/1947 | Boothroyd | 340—235 X |
| 2,680,699 | 6/1954 | Rubin. | |
| 2,735,907 | 2/1956 | Inman | 200—61.05 |

NEIL C. READ, *Primary Examiner.*

D. MYER, *Assistant Examiner.*